US009507568B2

(12) United States Patent
Ringseth

(10) Patent No.: US 9,507,568 B2
(45) Date of Patent: *Nov. 29, 2016

(54) NESTED COMMUNICATION OPERATOR

(75) Inventor: Paul F. Ringseth, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 549 days.

This patent is subject to a terminal disclaimer.

(21) Appl. No.: 12/963,868

(22) Filed: Dec. 9, 2010

(65) Prior Publication Data

US 2012/0151459 A1 Jun. 14, 2012

(51) Int. Cl.
G06F 9/44 (2006.01)
G06F 9/45 (2006.01)

(52) U.S. Cl.
CPC .................. G06F 8/314 (2013.01); G06F 8/45 (2013.01)

(58) Field of Classification Search
CPC .......................................... G06F 8/445–8/456
See application file for complete search history.

(56) References Cited

U.S. PATENT DOCUMENTS

| 4,156,910 | A |   | 5/1979  | Barton et al. |         |
|-----------|---|---|---------|----------------|---------|
| 5,179,702 | A |   | 1/1993  | Spix et al.    |         |
| 5,551,039 | A | * | 8/1996  | Weinberg et al.| 717/150 |
| 5,710,927 | A |   | 1/1998  | Robison        |         |
| 5,812,852 | A |   | 9/1998  | Poulsen et al. |         |
| 5,999,729 | A | * | 12/1999 | Tabloski et al.| 717/105 |
| 6,018,628 | A |   | 1/2000  | Stoutamire     |         |
| 6,026,234 | A |   | 2/2000  | Hanson et al.  |         |
| 6,088,511 | A |   | 7/2000  | Hardwick       |         |
| 6,106,575 | A | * | 8/2000  | Hardwick ............... G06F 8/423 712/229 |
| 6,260,036 | B1 |   | 7/2001  | Almasi et al.  |         |
| 6,433,802 | B1 |   | 8/2002  | Ladd           |         |
| 6,442,541 | B1 |   | 8/2002  | Clark et al.   |         |
| 6,550,059 | B1 | * | 4/2003  | Choe et al. ................... 717/159 |
| 6,560,774 | B1 | * | 5/2003  | Gordon et al. ............... 717/146 |
| 6,622,301 | B1 | * | 9/2003  | Hirooka et al. ............... 717/149 |
| 6,708,331 | B1 |   | 3/2004  | Schwartz       |         |
| 6,934,940 | B2 |   | 8/2005  | Bates et al.   |         |
| 7,096,422 | B2 |   | 8/2006  | Rothschiller et al. |    |
| 7,171,655 | B2 |   | 1/2007  | Gordon et al.  |         |

(Continued)

FOREIGN PATENT DOCUMENTS

| JP | 5-298272   | 11/1993 |
|----|------------|---------|
| WO | 2012053017 | 4/2012  |

OTHER PUBLICATIONS

Blelloch, et al., "Implementation of a Portable Nested Data-Parallel Language", Retrieved at << http://www.cs.cmu.edu/~jch/publications/nesl-ppopp93.pdf >>, Fourth ACM SIGPLAN Symposium on Principles and Practice of Parallel Programming (PPoPP), ACM, 1993, pp. 10.

(Continued)

Primary Examiner — Tuan Q. Dam
Assistant Examiner — Zheng Wei
(74) Attorney, Agent, or Firm — Kevin Sullivan; Micky Minhas

(57) ABSTRACT

A high level programming language provides a nested communication operator that partitions a computational space. An indexable type with a rank and element type defines the computational space. The nested communication operator partitions a specified dimension of an index indexable type into segments specified by a segmentation vector and returns an output indexable type that represents the segments. By doing so, the nested communication operator allows data parallel algorithms to operate on the segments as individual units.

20 Claims, 3 Drawing Sheets

(56) References Cited

U.S. PATENT DOCUMENTS

| | | | |
|---|---|---|---|
| 7,210,127 B1* | 4/2007 | Rangachari | 717/128 |
| 7,373,640 B1 | 5/2008 | English et al. | |
| 7,464,103 B2 | 12/2008 | Siu et al. | |
| 7,533,246 B2 | 5/2009 | Taylor | |
| 7,584,465 B1 | 9/2009 | Koh et al. | |
| 7,689,980 B2* | 3/2010 | Du | G06F 8/453 717/140 |
| 7,739,466 B2 | 6/2010 | Rozas et al. | |
| 7,800,620 B2 | 9/2010 | Tarditi, Jr. et al. | |
| 7,853,937 B2 | 12/2010 | Janczewski | |
| 7,926,046 B2 | 4/2011 | Halambi et al. | |
| 7,979,844 B2 | 7/2011 | Srinivasan | |
| 7,983,890 B2* | 7/2011 | Bliss et al. | 703/15 |
| 8,010,945 B1 | 8/2011 | Kilgard et al. | |
| 8,046,745 B2* | 10/2011 | Wong | 717/130 |
| 8,060,857 B2* | 11/2011 | Biggerstaff | G06F 8/456 717/106 |
| 8,127,283 B2 | 2/2012 | Sheynin et al. | |
| 8,209,664 B2* | 6/2012 | Yu et al. | 717/119 |
| 8,234,635 B2 | 7/2012 | Isshiki et al. | |
| 8,245,207 B1 | 8/2012 | English et al. | |
| 8,245,212 B2 | 8/2012 | Steiner | |
| 8,296,746 B2* | 10/2012 | Takayama et al. | 717/149 |
| 8,402,450 B2 | 3/2013 | Ringseth et al. | |
| 8,549,496 B2* | 10/2013 | Cooke et al. | 717/146 |
| 8,589,867 B2 | 11/2013 | Zhang et al. | |
| 8,713,039 B2 | 4/2014 | Ringseth et al. | |
| 8,806,426 B2* | 8/2014 | Duffy | G06F 8/00 717/106 |
| 8,813,053 B2 | 8/2014 | Wang et al. | |
| 8,839,212 B2* | 9/2014 | Cooke et al. | 717/146 |
| 8,839,214 B2* | 9/2014 | Ringseth et al. | 717/149 |
| 2001/0051971 A1 | 12/2001 | Kato | |
| 2002/0019971 A1 | 2/2002 | Zygmont et al. | |
| 2002/0126124 A1 | 9/2002 | Baldwin et al. | |
| 2003/0145312 A1 | 7/2003 | Bates et al. | |
| 2003/0187853 A1 | 10/2003 | Hensley et al. | |
| 2004/0128657 A1 | 7/2004 | Ghiya et al. | |
| 2005/0028141 A1 | 2/2005 | Kurhekar et al. | |
| 2005/0071828 A1* | 3/2005 | Brokenshire | G06F 9/44547 717/147 |
| 2005/0149914 A1 | 7/2005 | Krapf et al. | |
| 2005/0210023 A1* | 9/2005 | Barrera et al. | 707/5 |
| 2006/0036426 A1 | 2/2006 | Barr et al. | |
| 2006/0098019 A1 | 5/2006 | Tarditi, Jr. et al. | |
| 2006/0130012 A1* | 6/2006 | Hatano et al. | 717/136 |
| 2006/0276998 A1 | 12/2006 | Gupta et al. | |
| 2007/0011267 A1 | 1/2007 | Overton et al. | |
| 2007/0079300 A1* | 4/2007 | Du | G06F 8/453 717/149 |
| 2007/0127814 A1 | 6/2007 | Fluck et al. | |
| 2007/0169042 A1 | 7/2007 | Janczewski | |
| 2007/0169061 A1 | 7/2007 | Bera et al. | |
| 2007/0198710 A1 | 8/2007 | Gopalakrishnan | |
| 2007/0233765 A1 | 10/2007 | Gupta et al. | |
| 2007/0294666 A1 | 12/2007 | Papakipos et al. | |
| 2008/0005547 A1 | 1/2008 | Papakipos et al. | |
| 2008/0120594 A1 | 5/2008 | Lucas et al. | |
| 2008/0127146 A1 | 5/2008 | Liao et al. | |
| 2008/0134150 A1* | 6/2008 | Wong | 717/130 |
| 2008/0162385 A1 | 7/2008 | Madani et al. | |
| 2008/0178165 A1 | 7/2008 | Baker | |
| 2008/0235675 A1 | 9/2008 | Chen | |
| 2009/0064115 A1 | 3/2009 | Sheynin et al. | |
| 2009/0089560 A1 | 4/2009 | Liu et al. | |
| 2009/0089767 A1 | 4/2009 | Daynes et al. | |
| 2009/0113404 A1* | 4/2009 | Takayama et al. | 717/149 |
| 2009/0144747 A1 | 6/2009 | Baker | |
| 2009/0178053 A1 | 7/2009 | Archer et al. | |
| 2009/0204789 A1 | 8/2009 | Gooding et al. | |
| 2009/0271774 A1 | 10/2009 | Gordy et al. | |
| 2009/0307674 A1 | 12/2009 | Ng et al. | |
| 2009/0307699 A1 | 12/2009 | Munshi et al. | |
| 2010/0005080 A1 | 1/2010 | Pike et al. | |
| 2010/0082724 A1 | 4/2010 | Diyankov et al. | |
| 2010/0083185 A1 | 4/2010 | Sakai | |
| 2010/0094924 A1* | 4/2010 | Howard et al. | 709/201 |
| 2010/0131444 A1 | 5/2010 | Gottlieb et al. | |
| 2010/0146245 A1 | 6/2010 | Yildiz et al. | |
| 2010/0174883 A1 | 7/2010 | Lerner et al. | |
| 2010/0199257 A1* | 8/2010 | Biggerstaff | G06F 8/76 717/104 |
| 2010/0229161 A1* | 9/2010 | Mori | 717/149 |
| 2010/0235815 A1 | 9/2010 | Maybee et al. | |
| 2010/0241646 A1 | 9/2010 | Friedman et al. | |
| 2010/0241827 A1 | 9/2010 | Yu et al. | |
| 2010/0275189 A1* | 10/2010 | Cooke et al. | 717/146 |
| 2010/0293534 A1 | 11/2010 | Andrade et al. | |
| 2011/0271263 A1 | 11/2011 | Archer et al. | |
| 2011/0276789 A1* | 11/2011 | Chambers et al. | 712/220 |
| 2011/0314256 A1 | 12/2011 | Callahan, II et al. | |
| 2011/0314444 A1 | 12/2011 | Zhang et al. | |
| 2012/0005662 A1* | 1/2012 | Ringseth et al. | 717/149 |
| 2012/0089961 A1* | 4/2012 | Ringseth | 717/106 |
| 2012/0124564 A1 | 5/2012 | Ringseth et al. | |
| 2012/0131552 A1* | 5/2012 | Levanoni et al. | 717/119 |
| 2012/0166444 A1 | 6/2012 | Ringseth et al. | |
| 2012/0166771 A1 | 6/2012 | Ringseth | |
| 2014/0109039 A1* | 4/2014 | Cooke et al. | 717/106 |

OTHER PUBLICATIONS

Chakravarty, et al., "V—Nested Parallelism in C", Retrieved at << http://citeseerx.ist.psu.edu/viewdoc/download?doi=10.1.1.55. 8578& rep=rep1&type=pdf >>, Programming Models for Massively Parallel Computers, Oct. 9-12, 1995, pp. 1-9.

Miao, et al., "Extracting Data Records from the Web Using Tag Path Clustering", Retrieved at << http://www2009.org/proceedings/pdf/p981.pdf >>, The 18th International World Wide Web Conference, Apr. 20-24, 2009, pp. 981-990.

Emoto, et al., "Generators-of-generators Library with Optimization Capabilities in Fortress", Retrieved at << http://research.nii.ac.jp/~hu/pub/europar10.pdf >>, 16th International European Conference on Parallel and Distributed Computing (EuroPar 2010), Aug. 31-Sep. 3, 2010, pp. 1-12.

Sengupta, et al., "Efficient Parallel Scan Algorithms for GPUs", Retrieved at << http://mgarland.org/files/papers/nvr-2008-003.pdf, NVIDIA Technical Report NVR-2008-003, Dec. 2008, pp. 1-17.

Takahashi, et al., "Efficient Parallel Skeletons for Nested Data structures", Retrieved at http://research.nii.ac.jp/~hu/pub/pdpta2001-TIH.pdf >>, The International Conference on Parallel and Distributed Processing Techniques and Applications, (PDPTA), Jun. 25-28, 2001, pp. 7.

Blelloch, et al., "Segmented Operations for Sparse Matrix Computation on Vector Multiprocessors" School of Computer Science, Carnegie Mellon University, Pittsburgh, PA 15213, Aug. 1993, CMU-CS-93-173, pp. 1-23.

Garland et al., "Efficient Sparse Matrix-Vector Multiplication on CUDA", NVIDIA Technical Report NVR-2009-004, Dec. 2008, pp. 1-32.

Blelloch, et al., "Scans as Primitive Parallel Operations," IEEE Transactions on Computers, vol. 38, No. 11, pp. 1526-1538, Nov. 1989.

The Final Office Action for U.S. Appl. No. 12/902,404 mailed Jun. 10, 2015 (51 pgs.).

Belter, et al., "Automatic Generation of Tiled and Parallel Linear Algebra Routines", Retrieved at << http://vecpar.fe.up.pt/2010/workshops-iWAPT/Belter-Siek-Karlin-Jessup.pdf, Jul. 5, 2010, pp. 15.

Mattson, Tim, "Data Parallel Design Patterns", Retrieved at << http://parlab.eecs.berkeley.edu/wiki/_media/patterns/data_parallel.pdf, Jul. 5, 2010, pp. 7.

Brodman, et al., "New Abstractions for Data Parallel Programming", Retrieved at << http://www.usenix.org/event/hotpar09/tech/full_papers/brodman/brodman_html/ >>, Proceedings of the First USENIX conference on Hot topics in parallelism, 2009, pp. 11.

Gan, Ge, "Tile Reduction: the first step towards tile aware parallelization in OpenMP", Retrieved at << https://iwomp.zih.tu-dresden.de/downloads/TileReduction-Gan.pdf, Jul. 5, 2010, pp. 19.

(56) References Cited

OTHER PUBLICATIONS

Du, et al., "A Tile-based Parallel Viterbi Algorithm for Biological Sequence Alignment on GPU with CUDA", Retrieved at << http://www.hicomb.org/papers/HICOMB2010-03.pdf >>, Parallel & Distributed Processing, Workshops and Phd Forum (IPDPSW), 2010 IEEE International Symposium on, Apr. 19-23, 2010, pp. 8.
Goumas, et al., "Data Parallel Code Generation for Arbitrarily Tiled Loop Nests", Retrieved at << http://www.cslab.ece.ntua.gr/~maria/papers/PDPTA02.pdf >>, Proceedings of the International Conference on Parallel and Distributed Processing Techniques and Applications, vol. 2, Jun. 24-27, 2002, pp. 7.
Hadri, et al., "Enhancing Parallelism of Tile QR Factorization for Multicore Architectures", Retrieved at << http://www.netlib.org/lapack/lawnspdf/lawn222.pdf >>, Dec. 2009, pp. 19.
"International Search Report and Written Opinion", Mailed Date: Apr. 10, 2012, Application No. PCT/US2011/053017, Filed Date: Sep. 23, 2011, pp. 9.
Hammes, et al., "The SA-C Language—Version 1.0", Retrieved at <<www.cs.colostate.edu/cameron/Documents/sassy.pdf >>, Technical manual, Jun. 21, 2001, pp. 1-30.
Hammes, et al., "High Performance Image Processing on FPGAs", Retrieved at <<www.cs.colostate.edu/cameron/Publications/hammes_lacsi01.pdf>>, Los Almos Computer Science Institute Symposium, Santa Fe, NM, Oct. 15-18, 2001, pp. 10.
The Final Office Action for U.S. Appl. No. 12/902,404 mailed May 24, 2013 (21 pgs.).
The Office Action for U.S. Appl. No. 12/902,404 mailed Oct. 2, 2013 (22 pgs.).
The Final Office Action for U.S. Appl. No. 12/902,404 mailed Feb. 28, 2014 (21 pgs.).
Applicant Initiated Interview Summary for U.S. Appl. No. 12/902,404 mailed Jun. 23, 2014 (3 pgs.).
Doman, et al., "PARADOCS: A Highly Parallel Dataflow Computer and Its Dataflow Language", In Journal: Microprocessing and Microprogramming, vol. 7, Issue 1, Jan. 1, 1981, 12 Pages.
The Office Action for U.S. Appl. No. 12/902,404 mailed Jan. 2, 2015 (29 pgs.).
The Notice of Allowance mailed Nov. 29, 2012 (16 pgs.).
Nagaraja, et al., "A Parallel Merging Algorithm and Its Implementation With Java Threads", Retrieved at << http://citeseerx.ist.psu.edu/viewdoc/download?doi=10.1.1.90.2389&rep=rep1&type=pdf>>, Proceedings of MASPLAS'01 The Mid-Atlantic Student Workshop on Programming Languages and Systems, Apr. 27, 2001, p. 15.1-15.7.
Singhai, et al., "A Parametrized Loop Fusion Algorithm for Improving Parallelism and Cache Locality", Retrieved at << http://citeseerx.ist.psu.edu/viewdoc/download;jsessionid=7CFB7671C0A7F17205BA6BDB9BA66043?doi=10.1.1.105.6940&rep=rep1&type=pdf >>, The Computer Journal, vol. 40, No. 6, 1997, p. 340-355.
Yang, et al, "Integrating Parallel Algorithm Design With Parallel Machine Models", Retrieved at << http://www.dis.eafit.edu.co/depto/documentos/p131-yang—Integrating Parallel Algorithm Design With Parallel Machine Models.pdf >>, vol. 27, No. 1, Mar. 1995, pp. 131-135.
Peter M. Kogge et al., A Parallel Algorith for the Efficient Solution of a General Class of Recurrence Equations, IEEE vol C-22 Issue 8, Aug. 1973, [Retrieved on Aug. 29, 2012]. Retrieved from the internet: <URL: http://ieeexplore.ieee.org/stamp/stamp.jsp?tp=&arnumber=5009159> 8 pages (786-793).
Peiyi Tang et al., Processor Self-Scheduling for Multiple-Nested Parallel Loops , IEEE, 1986, [Retrieved on Aug. 29, 2012]. Retrieved from the internet: <URL: http://www.ualr.edu/pxtang/papers/icpp86.pdf> 8 Pages (528-535).
John H. Reif, An optimal Parallel Algorith for Integer Sorting, Oct. 1985, [Retrieved on Aug. 29, 2012]. Retrieved from the internet: <URL: http://ieeexplore.ieee.org/stamp/stamp.jsp?tp=&arnumber=4568176> 9 Pages (496-504).
"International Search Report", Mailed Date: May 16, 2012, Application No. PCT/US2011/058637, Filed Date: Oct. 31, 2011, pp. 8.

Catanzaro, Bryan et al., "Copperhead: Compiling an Embedded Data Parallel Language," Electrical Engineering and Computer Sciences, University of California at Berkeley, pp. 12, (Oct. 16, 2010).
Svensson Joel, et al., "GPGPU Kernal Implementation and Refinement Using Obsidian," Procedia Computer Science, vol. 1, No. 1, pp. 2065-2074.
Sato, Shigeyuki et al., A Skeletal Parallel Framework with Fusion Optimizer for CPCPU Programming, Programming Languages and Systems, pp. 79-94 (2009).
Lee, Sean et al., "GPU Kernels as Data-Parallel Array Computations in Haskell," Workshop on Exploiting Parallelism using GPUs and other Hardware-Assisted Methods (EPHAM) pp. 1-10 (Mar. 22, 2009).
The Office Action for U.S. Appl. No. 12/949,908 mailed Feb. 4, 2013 (22 pgs).
Yair Shapira, "Solving Pdes in C++: Numerical methods in a unified Object-oriented Approach", SIAM, Jan. 13, 2006.
The Final Office Action for U.S. Appl. No. 12/949,908 mailed Aug. 27, 2013 (16 pgs).
The Advisory Action for U.S. Appl. No. 12/949,908 mailed Nov. 12, 2013 (2 pgs).
The Examiner-Initiated Interview Summary for U.S. Appl. No. 12/949,908 mailed Jan. 14, 2014 (2 pgs).
The Applicant-Initiated Interview Summary for U.S. Appl. No. 12/949,908 mailed Jan. 21, 2014 (4 pgs).
The Office Action for U.S. Appl. No. 12/949,908 mailed Feb. 13, 2014 (18 pgs).
The Final Office Action for U.S. Appl. No. 12/949,908 mailed Jun. 26, 2014 (21 pgs).
The Office Action for U.S. Appl. No. 12/949,908 mailed Nov. 3, 2014 (24 pgs).
The Final Office Action for U.S. Appl. No. 12/949,908 mailed Apr. 16, 2015 (21 pgs).
Chien, Andrew A., "ICC++—A C++ Dialect for High Performance Parallel Computing", Retrieved at << http://delivery.acm.org/10.1145/250000/240740/p19-chien.pdf?key1=240740&key2=9793729721&coll=GUIDE&dl=GUIDE&CFID=97193401& CFTOKEN=57231285 >>, vol. 4, No. 1, 1996, p. 19-23.
"Const Correctness", Retrieved at << http://www.cprogramming.com/tutorial/const_correctness.html , retrieved date; Jul. 16, 2010, pp. 4.
Wu, et al., "GPU-Accelerated Large Scale Analytics", Retrieved at << http://www.hpl.hp.com/techreports/2009/HPL-2009-38.pdf >>, Mar. 6, 2009, pp. 11.
"Const and Immutable", Retrieved at << http://www.digitalmars.com/d/2.0lconst3.html >>, Retrieved date: Jul. 16, 2010, pp. 7.
Avila, Rafael Bohrer, "A comparative study on DPC++ and other concurrent object-oriented languages", Retrieved at << http://www.google.co.uk/url?sa=t&source=web&cd=1&ved=0CBcQ2FjAA&url=http%3A%2F%2Fciteseerx.ist.psu.edu%2Fviewdoe%2Fdownload%3Fdoi%3D10.1.1.27.3438%26rep%3Drep1%26type%3Dpdf&ei=YN0_TOrSFob20wSvnLWQBw&usg=AFQjCNHWqmYZDo5OQaGXW7NbLEIhxhMG5A >>, Dec. 1997, pp. 1-41.
The Office Action for U.S. Appl. No. 12/975,796 mailed Mar. 19, 2013 (29 pgs.).
Shih et al., Efficient Index Generation for Compiling Two-Level Mappings in Data-Parallel Programs, published by Journal of Parallel and distributed Computing, 2000, pp. 189-216.
The Final Office Action for U.S. Appl. No. 12/975,796 mailed Nov. 6, 2013 (27 pgs.).
The Office Action for U.S. Appl. No. 12/975,796 mailed Jun. 19, 2014 (27 pgs.).
The Final Office Action for U.S. Appl. No. 12/975,796 mailed Jan. 16, 2015 (21 pgs.).
Chamberlain, et al., "User-Defined Distributions and Layouts in Chapel: Philosophy and Framework", Retrieved at << http://chapel.cray.com/publications/hotpar10-final.pdf , 2nd USENIX Workshop on Hot Topics in Parallelism, Jun. 2010, pp. 6.

(56) References Cited

OTHER PUBLICATIONS

Diaconescu, et al., "An Approach to Data Distributions in Chapel", Retrieved at << http://citeseerx.ist.psu.edu/viewdoc/download?doi=10.1.1.94.8748&rep=rep1&type=pdf >>, International Journal of High Performance Computing Applications, vol. 21, No. 3, Aug. 2007, pp. 313-335.

Moore, Reagan W., "Digital Libraries, Data Grids, and Persistent Archives", Retrieved at << http://www.sdsc.edu/NARA/PublicationsWeb/RICE-DL-12-01.ppt >>, Jan. 30, 2002, pp. 30.

Chang, et al., "Bigtable: A Distributed Storage System for Structured Data", Retrieved at << http://labs.google.com/papers/bigtable-osdi06.pdf >>, In Proceedings of the 7th Conference on USENIX Symposium on Operating Systems Design and Implementation, vol. 7, 2006, pp. 1-14.

R.D. Blumofe, C.E. Leiserson, "Scheduling multithreaded computations by work stealing," pp. 356-368, 35th Annual Symposium on Foundations of Computer Science (FOCS 1994), 1994.

"International Search Report and Written Opinion", Mailed Date—Aug. 9, 2012, Application No. PCT/US2011/066285, Filed Date—Dec. 20, 2011, pp. 8.

The Notice on the First Office Action for Chinese Application No. 201110434003.2 mailed Jan. 13, 2014 (3 pages).

The Office Action for U.S. Appl. No. 12/977,406 mailed Aug. 31, 2012 (14 pgs).

The Final Office Action for U.S. Appl. No. 12/977,406 mailed Feb. 20, 2013 (17 pgs).

The Office Action for U.S. Appl. No. 12/977,406 mailed Jul. 18, 2013 (19 pgs).

The Notice of Allowance for U.S. Appl. No. 12/977,406 mailed Dec. 11, 2013 (21 pgs).

R Jagannathan et al. "GLU__A High__Level System for Granular Data__Parallel Programming", Oct. 1995 pp. 1-25.

Mark Chu-Carroll et al. "Design and Implementation of a General Purpose Parallel Programming System," Department of Computer and Information Sciences University of Delaware, Nov. 14, 1995, pp. 1-9.

Diaconescu, Roxana et al. "Reusable and Extensible High Level Data Distributions", Workshop on Patterns in High Performance Computing, May 4-6, 2005, University of Illinois at Urbana-Champaign, pp. 1-10.

Petricek, Tomas, "Accelerator and F# (III.): Data-Parallel programs using F# quotations". <<http://tomasp.net/blog/accelerator-dataparallel.aspx>> Retrieved Oct. 20, 2010. pp. 2-9.

"Array Building Blocks: A Flexible Parallel Programming Model for Multicore and Many-Core Architectures" <<http://www.drdobbs.com/go-parallel/article/showArticle.jhtml;jsessionid=51NYX1OZXP>> Retrieved Oct. 20, 2010. pp. 1-4.

Hains, et al., "Array Structures and Data-Parallel Algorithms" Laboratoire d'informatique fondamentale d'Orleans, BP6759-45067 Orleans Cedex 2, France. pp. 1-8.

Keller, et al., "Regular, Shape-polymorphic, Parallel Arrays in Haskell", <<http://www.cse.unsw.edu.au/~chak/papers/KCLPL10.html>> Retrieved Dec. 2010. pp. 1-12.

Hermann, et al., "Size Inference of Nested Lists in Functional Programs" Fakultat fur Mathematik und Informatik, Universitat Passau, Germany. pp. 1-16.

The Office Action for U.S. Appl. No. 12/902,404 mailed Nov. 9, 2012 (26 pgs).

Grode, et al., "Hardware Resource Allocation for Hardware/Software Partitioning in the LYCOS System", In Proceedings of the Conference on Design, Automation and Test in Europe, Feb. 23, 1998, pp. 22-27.

Final Office Action for U.S. Appl. No. 12/902,404 mailed Jun. 10, 2015 (51 pgs.).

Notice of Allowance for U.S. Appl. No. 12/975,796 mailed Jul. 22, 2015 (28 pgs.).

Office Action for U.S. Appl. No. 12/902,404 mailed Dec. 2, 2015 (26 pgs.).

Notice of Allowance for U.S. Appl. No. 12/975,796 mailed Nov. 19, 2015 (11 pgs.).

Notice of Allowance for U.S. Appl. No. 12/975,796 mailed Mar. 11, 2016 (11 pgs.).

"Current Status of High Performance Fortran" written by Hitoshi Murai et al. and printed in System/Control/Information published on Jan. 15, 2008 (vol. 52, No. 1, pp. 14-20, 8 pages). (This reference was cited in an Office Action from a related foreign application. A concise explanation of relevance is submitted with an English language translation of the Notice of Reasons for Rejection. (4 pages)).

"WinPC Labs GPGPU" written by Takeshi Nishi and printed in Nikkei WinPC published by Nikkei BP Publications, Inc. on Apr. 29, 2010 (vol. 16, No. 9, pp. 164-165, 3 pages). (This reference was cited in an Office Action from a related foreign application. A concise explanation of relevance is submitted with an English language translation of the Notice of Reasons for Rejection. (4 pages)).

Notice of Allowance for U.S. Appl. No. 12/949,908 mailed Apr. 25, 2016 (36 pgs.).

\* cited by examiner

NESTED COMMUNICATION OPERATOR

BACKGROUND

Computer systems often include one or more general purpose processors (e.g., central processing units (CPUs)) and one or more specialized data parallel compute nodes (e.g., graphics processing units (GPUs) or single instruction, multiple data (SIMD) execution units in CPUs). General purpose processors generally perform general purpose processing on computer systems, and data parallel compute nodes generally perform data parallel processing (e.g., graphics processing) on computer systems. General purpose processors often have the ability to implement data parallel algorithms but do so without the optimized hardware resources found in data parallel compute nodes. As a result, general purpose processors may be far less efficient in executing data parallel algorithms than data parallel compute nodes.

Data parallel compute nodes have traditionally played a supporting role to general purpose processors in executing programs on computer systems. As the role of hardware optimized for data parallel algorithms increases due to enhancements in data parallel compute node processing capabilities, it would be desirable to enhance the ability of programmers to program data parallel compute nodes and make the programming of data parallel compute nodes easier.

Data parallel algorithms often implement specialized programming paradigms that perform efficient operations on large sets of data. One of these paradigms includes segmented operators such as a segmented scan or segmented reduce. These operators operate on input data that may be represented as nested data structures. Nested data structures, however, typically involve a detailed tracking of indices that map the data. As a result, the process of forming nested data structures may be error prone and difficult to implement.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A high level programming language provides a nested communication operator that partitions a computational space. An indexable type with a rank and element type defines the computational space. The nested communication operator partitions a specified dimension of an index indexable type into segments specified by a segmentation vector and returns an output indexable type that represents the segments. By doing so, the nested communication operator allows data parallel algorithms to operate on the segments as individual units.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
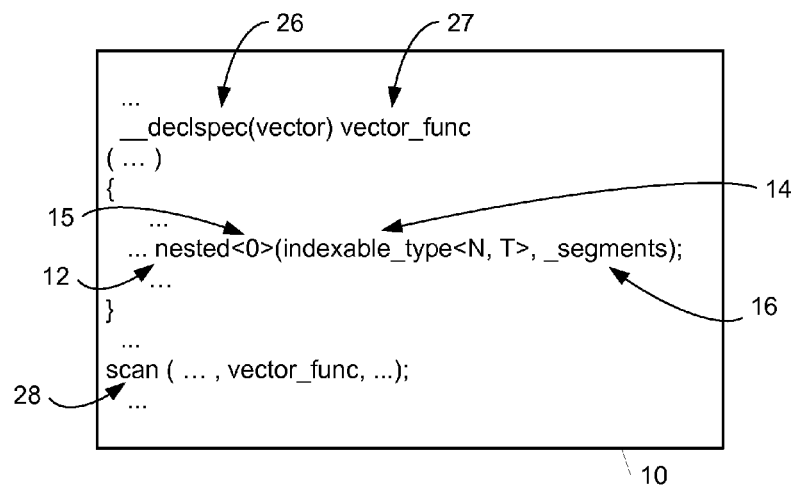
FIG. 1 is a computer code diagram illustrating an embodiment of code with a nested communication operator.

FIG. 1 is a computer code diagram illustrating an embodiment of code 10 with a nested communication operator 12. When compiled and executed, nested communication operator 12 generates a segmented computational space in accordance with a specified dimension and a segmentation vector. By doing so, nested communication operator 12 allows data parallel algorithms to operate on segments of the computational space as individual units.

Figure 4:
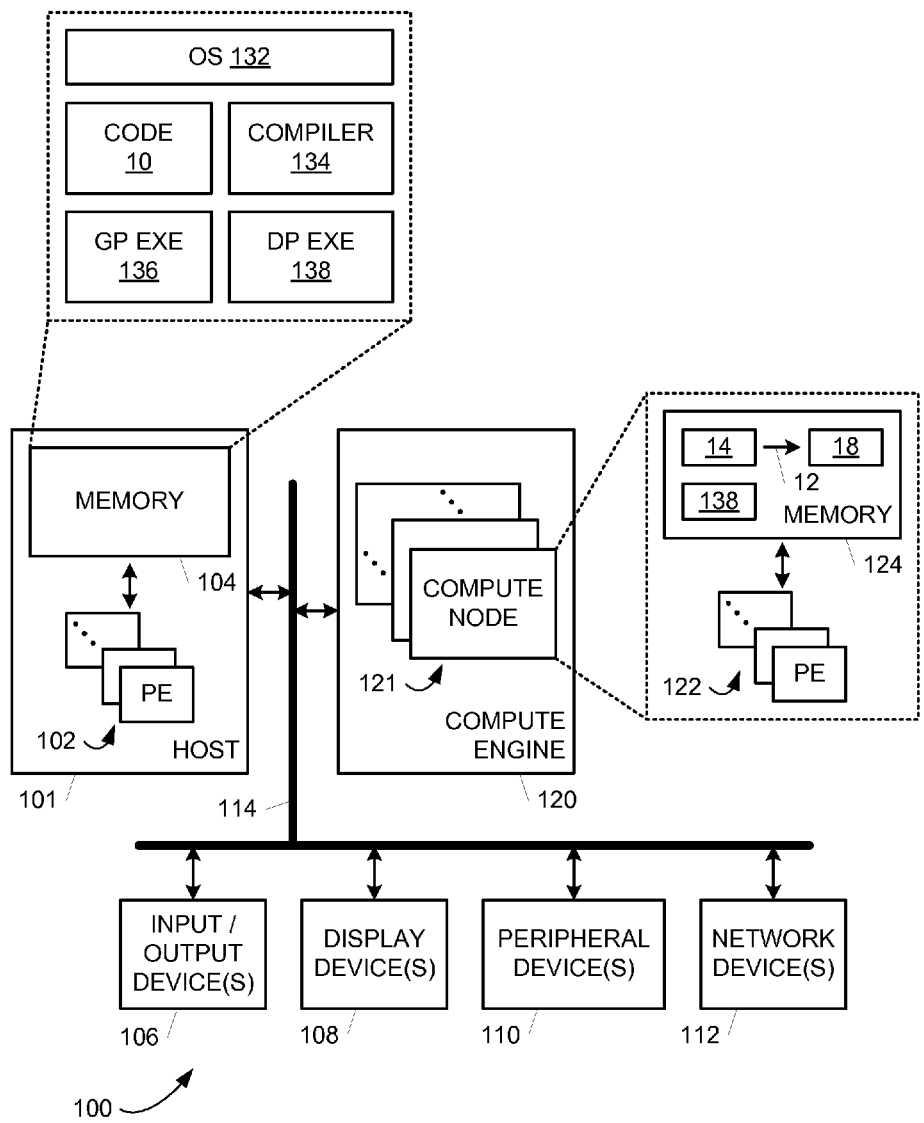
FIG. 4 is a block diagram illustrating an embodiment of a computer system configured to compile and execute data parallel code that includes a nested communication operator.

Code 10 includes a sequence of instructions from a high level general purpose or data parallel programming language that may be compiled into one or more executables (e.g., DP executable 138 shown in FIG. 4) for execution by one or more DP optimal compute nodes (e.g., DP optimal compute nodes 121 shown in FIG. 4).

In one embodiment, code 10 includes a sequence of instructions from a high level general purpose programming language with data parallel extensions (hereafter GP language) that form a program stored in a set of one or more modules. The GP language may allow the program to be written in different parts (i.e., modules) such that each module may be stored in separate files or locations accessible by the computer system. The GP language provides a single language for programming a computing environment that includes one or more general purpose processors and one or more special purpose, DP optimal compute nodes. DP optimal compute nodes are typically graphic processing units (GPUs) or SIMD units of general purpose processors but may also include the scalar or vector execution units of general purpose processors, field programmable gate arrays (FPGAs), or other suitable devices in some computing environments. Using the GP language, a programmer may include both general purpose processor and DP source code in code 10 for execution by general purpose processors and DP compute nodes, respectively, and coordinate the execution of the general purpose processor and DP source code. Code 10 may represent any suitable type of code in this embodiment, such as an application, a library function, or an operating system service.

The GP language may be formed by extending a widely adapted, high level, and general purpose programming language such as C or C++ to include data parallel features. Other examples of general purpose languages in which DP features may appear include Java™, PHP, Visual Basic, Perl, Python™, C#, Ruby, Delphi, Fortran, VB, F#, OCaml, Haskell, Erlang, NESL, Chapel, and JavaScript™. The GP language implementation may include rich linking capabilities that allow different parts of a program to be included in different modules. The data parallel features provide programming tools that take advantage of the special purpose architecture of DP optimal compute nodes to allow data parallel operations to be executed faster or more efficiently than with general purpose processors (i.e., non-DP optimal compute nodes). The GP language may also be another suitable high level general purpose programming language that allows a programmer to program for both general purpose processors and DP optimal compute nodes.

In another embodiment, code 10 includes a sequence of instructions from a high level data parallel programming language (hereafter DP language) that form a program. A DP language provides a specialized language for programming a DP optimal compute node in a computing environment with one or more DP optimal compute nodes. Using the DP language, a programmer generates DP source code in code 10 that is intended for execution on DP optimal compute nodes. The DP language provides programming tools that take advantage of the special purpose architecture of DP optimal compute nodes to allow data parallel operations to be executed faster or more efficiently than with general purpose processors. The DP language may be an existing DP programming language such as HLSL, GLSL, Cg, C, C++, NESL, Chapel, CUDA, OpenCL, Accelerator, Ct, PGI GPGPU Accelerator, CAPS GPGPU Accelerator, Brook+, CAL, APL, Fortran 90 (and higher), Data Parallel C, DAPPLE, or APL. Code 10 may represent any suitable type of DP source code in this embodiment, such as an application, a library function, or an operating system service.

Code 10 includes code portions designated for execution on a DP optimal compute node. In the embodiment of FIG. 1 where code 10 is written with a GP language, the GP language allows a programmer to designate DP source code using an annotation 26 (e.g.,_declspec(vector) . . . ) when defining a vector function. The annotation 26 is associated with a function name 27 (e.g., vector_func) of the vector function that is intended for execution on a DP optimal compute node. Code 10 may also include one or more invocations 28 of a vector function (e.g., scan . . . , vector_func, . . . ) at a call site (e.g., forall, reduce, scan, or sort). A vector function corresponding to a call site is referred to as a kernel function. A kernel function may call other vector functions in code 10 (i.e., other DP source code) and may be viewed as the root of a vector function call graph. A kernel function may also use types (e.g., classes or structs) defined by code 10. The types may or may not be annotated as DP source code. In other embodiments, other suitable programming language constructs may be used to designate portions of code 10 as DP source code and/or general purpose processor code. In addition, annotations 26 may be omitted in embodiments where code 10 is written in a DP language.

Figure 2:
FIG. 2 is a block diagram illustrating an embodiment of applying a nested communication operator to an input indexable type.

FIG. 2 is a block diagram illustrating an embodiment of applying nested communication operator 12 to input indexable type 14 to produce an output indexable type 18. As used herein, an indexable type is any data type that implements one or more subscript operators along with a rank, which is a non-negative integer, and a type which is denoted element type. If index<N> is a type that represents N-tuples of integers (viz., any type of integral data type), an instance of index<N> is a set of N integers {i0, i1, . . . , im} where m is equal to N−1 (i.e., an N-tuple). An index operator of rank N takes an N-tuple instance of index<N> and associates the instance with another instance of a type called the element type where the element type defines each element in an indexable type. In one embodiment, an indexable type defines one or more of the following operators:

```
element_type operator[ ] (index_declarator);
    const element_type operator[ ] (index_declarator)
const;
    element_type& operator[ ] (index_declarator);
    const element_type& operator[ ] (index_declarator)
const;
        element_type&& operator[ ] (index_declarator); or
        const element_type&& operator[ ] (index_declarator)
const;
    where index_declarator takes the form of at least one
of:
    const index<rank>& idx;
    const index<rank> idx;
    index<rank>& idx;
    index<rank> idx.
```

In other embodiments the operators may be functions, functors or a more general representation. An indexable type's shape is the set of index<rank> for which one of the above subscript operators is defined. An indexable type typically has a shape that is a polytope—i.e., an indexable type may be algebraically represented as the intersection of a finite number of half-spaces formed by linear functions of the coordinate axes.

With reference to FIGS. 1 and 2, the high level language of code 10 provides a nested communication operator 12 for use on input indexable type 14 in a data parallel computing environment. Input indexable type 14 has a rank (e.g., rank N in the embodiment of FIG. 1) and element type (e.g., element type T in the embodiment of FIG. 1) and defines the computational space that is operated on by nested communication operator 12. Nested communication operator 12 receives an input indexable type 14, a specified dimension 15 of the input indexable type 14 (e.g., dimension <0> in the example of FIG. 1), and a segmentation vector 16 (e.g., _ segments in the example of FIG. 1). From input indexable type 14, specified dimension 15, and segmentation vector 16, nested communication operator 12 produces an output indexable type 18 that represents the segments of input indexable type 14 specified by segmentation vector 16 in the specified dimension 15.

Figure 3A:
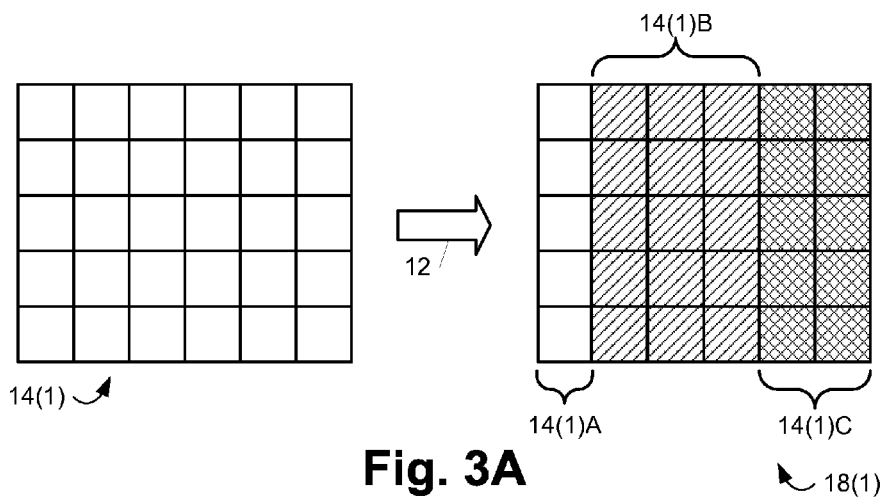
FIGS. 3A-3C is are block diagrams illustrating examples of generating an output indexable type with a nested communication operator.

FIG. 3A is a block diagram illustrating an example of generating an output indexable type 18(1) with nested communication operator 12 where the specified dimension 15(1) (not shown) is dimension <1>. In the example of FIG. 3A, nested communication operator 12 partitions a 5×6 matrix (i.e., an input indexable type 14(1)) into three segments 14(1)A, 14(1)B, and 14(1)C in dimension <1>. The segmentation vector 16(1) (not shown) specifies that the first segment 14(1)A includes the first column, the second segment 14(1)B includes the second through the fourth columns, and the third segment 14(1)C includes the fifth and the sixth columns. The output indexable type 18(1) generated by nested communication operator 12 represents segments 14(1)A, 14(1)B, and 14(1)C of input indexable type 14(1).

Figure 3B:
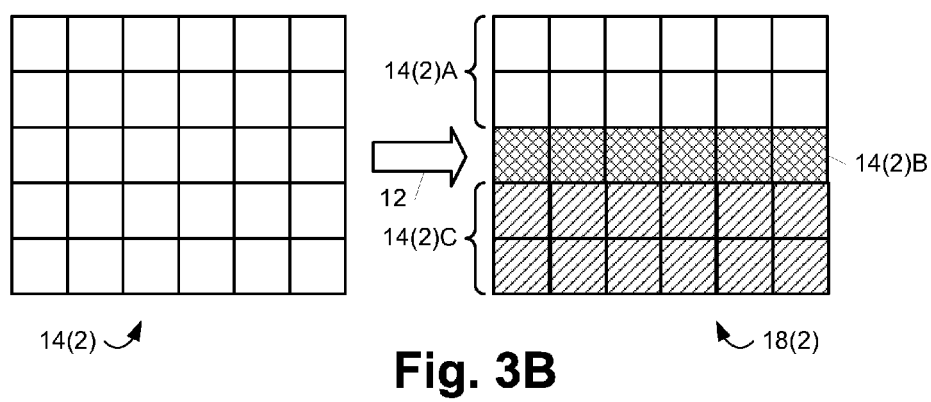

FIG. 3B is a block diagram illustrating an example of generating an output indexable type 18(2) with nested communication operator 12 where the specified dimension 15(2) (not shown) is dimension <0>. In the example of FIG. 3B, nested communication operator 12 partitions a 5×6 matrix (i.e., an input indexable type 14(2)) into three segments 14(2)A, 14(2)B, and 14(2)C in dimension <0>. The segmentation vector 16(2) (not shown) specifies that the first segment 14(2)A includes the first and second rows, the second segment 14(2)B includes the third row, and the third segment 14(2)C includes the fourth and fifth rows. The output indexable type 18(2) generated by nested communication operator 12 represents segments 14(2)A, 14(2)B, and 14(2)C of input indexable type 14(2).

Figure 3C:
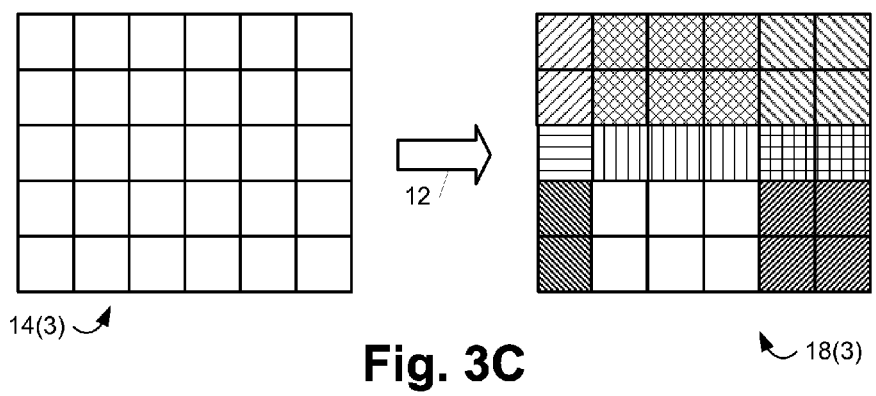

Nested communication operator 12 may be composed with other nested communications operators 12 to further segment an input indexable type 14 as illustrated in the example of FIG. 3C. In FIG. 3C, the nested communication operator 12 of FIG. 3A is composed with the nested communication operator 12 of FIG. 3B as follows.

nested<0>(nested<1>(_data,_colSegs), _rowSegs);

In this example, _colSegs is the segmentation vector 16(1) of FIG. 3A as described above and _rowSegs is the segmentation vector 16(2) of FIG. 3B as described above.

In the example of FIG. 3C, the first nested communication operator 12 partitions an input indexable type 14(3) into three segments in dimension <1> and the second communication operator 12 further partitions each of the three segments of input indexable type 14(3) into three segments in dimension <0>. The output indexable type 18(3) generated by the composition of the nested communication operators 12 represents nine segments of input indexable type 14(3) as illustrated by the different shadings of each segment shown in FIG. 3C.

Nested communication operator 12 forms a segmented indexable type that includes the following data structures where inputData represents the input indexable type 14, segmented_dimension represents the specified dimension 15, and segmentationPoints represents the segmentation vector 16.

```
field<_Rank, _Element_type> inputData;
field<1, int> segmentationPoints;
int segmented_dimension;
```

The segmented indexable type may also be represented as the following where _Parent_type represents a defined indexable type and _Parent represents the input indexable type 14.

```
_Parent_type _Parent;
field<1, int> segmentationPoints;
int segmented_dimension;
```

In one example, the following code portion may be used to implement nested communication operator 12 as "nested" using the defined nested_range indexable type that follows where segmented_dimension becomes the template parameter_Dim.

```
//
// nested communication operator
//
    template <int _Dim, typename _Parent_type>
    nested_range<_Dim, _Parent_type>
    nested(const _Parent_type& _Parent,
               const field<1, int>& _Segments) {
        return nested_range<_Dim, _Parent_type>(_Parent,
           _Segments);
    }
}
template <int _Dim, typename _Parent_type>
class nested_range : protected _Parent_type {
public:
    static const int rank = _Parent_type::rank;
    typedef typename _Parent_type parent_type;
    typedef typename _Parent_type::element_type element_type;
    //
    // communication operator ctor -- instance object creation
    //
    nested_range(const _Parent_type& _Parent,
               const field<1, int>& _Segments)
        : _Parent_type(_Parent), _M_segments(_Segments) {
    }
    //
    // restriction operator ctor, for tiling and projection and creating
    sub-objects
    //
    template <typename _Other_parent_type>
    nested_range(const grid<_Rank>& _Grid,
               const _Other_parent_type& _Parent)
        : _Parent_type(_Grid, _Parent) {
    }
    //
    // index ops -- '@' represents return-by-reference,
    //    return-by-Rvalue-reference, return-by-value,
    // and is the same as the index operators in _Parent_type.
    //
    element_type@ operator[ ] (const index<rank>& _Index) {
        _Parent_type& base = *static_cast<_Parent_type*> (this);
        return base[ _Index ];
    }
    //
    // segment ops -- return the sub-object determined by the segment
    defined by:
    //        [_M_segments[segment], _M_segments[segment+1])
    // in the dim-direction.
    //
    parent_type segment(int segment) {
        _Parent_type& base = *static_cast<_Parent_type*> (this);
        return section(base, segment_grid(segment));
    }
    //
    // grid segment ops -- return the shape of
    // the sub-object determined by the segment defined by:
    //        [_M_segments[segment], _M_segments[segment+1])
    // in the dim-direction.
    //
    // extent is a rank-tuple of positive integers.
    // index is a rank-tuple of integers.
    //
    // template <int rank> struct grid {
    //     grid(extent<rank> _Extent, index<rank> _Offset)
    //          : m_extent(_Extent), m_offset(m_offset) { }
    //     extent<rank> m_extent;
    //     index<rank> m_offset;
    // };
    //
    // grid.m_extent represents the dimensions of a rank-dimensional
    // rectangle with faces parallel to the coordinate axis. Whereas
    // grid.m_offset represents a vector offset from the origin.
    //
    grid<rank> segment_grid(int segment) {
        //
        // Results may be memoized.
        //
        extent<rank> _Extent(_Parent_type::get_extent( ));
        index<rank> _Offset(_Parent_type::get_offset( ));
        _Extent[_Dim] = _M_segments[segment+1] –
           _M_segments[segment];
        _Offset[_Dim] += _M_segments[segment];
        return grid<rank>(_Extent, _Offset);
```

```
        }
        //
        // segmentation point accessor
        //    return upper bound of geometric segment
        //
        int segmentation_point(int segment) {
            return _M_segments[segment+1];
        }
        //
        // _M_segment accessors
        //
        const field<1, int>& segments( ) const {
            return _M_segments;
        }
        void segments(const field<1, int>& _Segments) {
            _M_segments = _Segments;
        }
        //
        // Return the _Parent in order to see previous nesting levels
        //
        const _Parent_type& parent( ) const {
            return *this;
        }
protected:
        field<1, int> _M_segments;
};
```

In the above code portion, the nested communication operator 12 "nested" produces an output indexable type 18 using the nested_range indexable type for an input indexable type 14 represented by _Parent.

The indexable type nested_range includes methods that return the sections of the input indexable type 14 that form the segments described by the segmentation vector 16. The subscript operators of nested_range forward to _Parent_type[ ].

The section communications operator in the above code portion generates a sub-indexable type specified by a sub-grid where the sub-grid is defined by an extent vector and displaced by an offset vector. The section communications operator does not define a new indexable type. The section communications operator, when applied, results in the same indexable type. The section communications operator may be constructed using a constructor that is used for an indexable type for the creation of sub-indexable types. The constructor is a subset copy-constructor (viz., a copy-constructor that constructs a new indexable type) as follows.

indexable_type(const grid<_Rank>&_Grid, const indexable_type& _Parent);

The implementation of the section communications operator, in one embodiment, is as follows.

```
        //
        // section communication operator
        //
        template <typename _Parent_type>
        _Parent_type section(const _Parent_type& _Parent,
                const grid<_Parent_type::rank>& _Sub_grid) {
            return _Parent_type(_Sub_grid, _Parent);
        }
```

Using template meta-programming techniques, the index operators of the above implementation of nested communication operator 12 will return by-lvalue-reference when applied to an input indexable type 14 that returns by-lvalue-reference, by-rvalue-reference when applied to an input indexable type 14 that returns by-rvalue-reference, or by-value when applied to an input indexable type 14 that returns by-value.

As an example, the following code provides a data parallel quicksort algorithm that uses scan, segmented scan, split, and segmented split operations.

```
//
// Using the DPC++ call-site primitive 'scan' to implement +scan.
//
template <typename _Input_type, typename _Output_type>
void plus_scan(_Input_type _Input, _Output_type _Output) {
    typedef typename _Input_type::element_type elem_type;
    scan(_Input.get_grid( ),
        [=] (elem_type x, elem_type y)->elem_type{ return x + y; },
        _Output,
        [=] (elem_type x)->elem_type{ return x; }
        _Input);
}
//
// Using the DPC++ call-site primitive 'reduce' to implement +reduce.
//
template <typename _Input_type, typename _Output_type>
_Input_type::element_type plus_reduce(_Input_type _Input) {
    typedef typename _Input_type::element_type elem_type;
    elem_type _Output( ); // default value of elem_type
    reduce(_Input.get_grid( ),
            [=] (elem_type x, elem_type y)->elem_type{ return x + y; },
            _Output,
            [=] (elem_type x)->elem_type{ return x; }
            _Input);
}
//
// For all idx, place all entries _Input[idx] such that
//   _Flags[idx] == true, in _Output in the same order.
//
// [ 5 7 3 8 4 2 6 ]
// [ 1 1 0 1 0 1 0 ]
// _Output=> [5 7 8 2]
//
// after the plus scan the flags turn into:
// [ 0 1 2 2 3 3 4 4 ] -- always include an extra entry at the end
//    0 1 2 3
```

```
// So when __Plus_scan[idx+1] != __Plus_scan[idx], place
// __Input[idx] into __Output[__Plus_scan[idx]].
//
void pack(field<1, double> __Input, field<1, double> __Output, field<1, int> __Flags) {
// double is just an arbitrary choice of element type
    field<1, int> __Plus_scan;
    plus_scan(__Flags, __Plus_scan); // [ 1 1 0 1 0 1 0 ] => [ 0 1 2 2 3 3 4 4 ]
    do_all_in_parallel(int idx = 0; idx < __Input.get_extent(0); ++idx) {
        if (__Plus_scan[idx] != __Plus_scan[idx+1])
            __Output[__Plus_scan[idx]] = __Input[idx];
    }
}
//
// For all idx, place all entries __Input[idx] such that
// __Flags[idx] == true, first in __Output in the same order and
// all entries with __Flags[idx] == false, last in __Ouput
// in the same order.
//
// [ 5 7 3 8 4 2 6 ]
// [ 1 1 0 1 0 1 0 ]
// __Output=> [5 7 8 2 3 4 6]
//
// This can be most easily realized as two applications of pack,
// the first on __Flags, the second on the complement !__Flags.
//
// After the plus scan the flags turn into:
// [ 0 1 2 2 3 3 4 4 ] -- always include an extra entry at the end
//     0 1 2 3
// So when __Plus_scan[idx+1] != __Plus_scan[idx], place
// __Input[idx] into __Output[__Plus_scan[idx]].
//
// Now take the plus_reduce of __Flags => call it 'sum'.
//        int sum = plus_reduce(__Flags);
//
// After the plus scan of the complement !__Flags:
// scan-output=[ 0 0 0 1 1 2 2 3 ].
// Then, as before, look for idx where
//        __Plus_scan[idx+1] != __Plus_scan[idx]
// and place __Input[idx] into __Output[sum + __Plus_scan[idx]].
//
// A slightly more efficient implementation would have length =
__Input.get_extent(0),
// and subtract from length a reverse scan of !__Flags. In fact, 'split'
// may be implemented as a single data-parallel kernel call, viz., Both packs
// are done simultaneously.
//
void split(field<1, double> __Input, field<1, double> __Output, field<1, int> __Flags) {
// double is just an arbitrary choice of element type
    pack(__Input, __Output, __Flags);
    int sum = plus_reduce(__Flags);
    // take the subset of __Output starting at the 'sum' slot
    __Out2 = section(__Output,
                grid<1>(__Output.get_grid( ).m_extent – sum,
                        __Output.get_grid( ).m_offset + sum));
    pack(__Input, __Out2, !__Flags);
    // Since __Out2 is a reference to the middle of __Output, any
    // modification to __Out2 also modifies __Output. So we're done.
}
//
// Each of the operations reduce, scan or split have segmented forms.
// The way to think about a segmented form is that each segment specifies
// a separate and independent reduce, scan or split. For example, if
// the input has 3 segments, then 3 separate reduce, scan or split take
// place -- one for each segment. Consider input with 2 segments and a
// set of flags for a split operation:
//        [[5 7 9 1 4][3 6 8 2]]
//        [[1 0 0 1 1][1 0 0 1]]
// split =>
//        [[5 1 4 7 9][3 2 6 8]]
//
//
// The nested communication operator 12 keeps track of segments
// of a field in one of the dimensions (viz., a field might be rank 3, but
// we only look at segments in one of the dimensions 0, 1 or 2.)
//
// Just using fields (field is metaphor for indexable type) that are 1-dimensional is
// a more obvious abstraction as we'll see in the following example, which is an
// implementation of quicksort using 'nested' indexable types.
//
```

```
//
// For each segment, all entries __Flags[idx] == true go to the left and all entries
__Flags[idx] == false
// go to the right, with the order otherwise unchanged. However, for each __Input
segment, the __Output
// will have two segments -- the true flags are one segment and the false flags are the
other.
//         [[5 7 9 1 4][3 6 8 2]]
//         [[1 0 0 1 1][1 0 0 1]]
// segmented_split =>
//         [[[5 1 4][7 9]][[3 2][6 8]]]
// Note that if all flags are the same for a given segment, then one of the output
// segments will be empty. These need tracking in some algorithms.
//
// The implementation of segmented-scan is usually done by assigning CPUs or
SIMD
// units to each segment and then performing a normal scan on each segment. Load
balancing
// all scenarios, takes skill and patience.
//
// Assume __Output and __Flags are allocated to have the same number of elements as
__Input.
//
void segmented_split(nested_range<field<1, double>> __Input,
nested_range<field<1, double>> __Output, field<1, int> __Flags) {
    // __Input.segments( ) contains 1 point for every segment boundary.
    // For example, 2 contiguous segments would take 3 points, the lower bound index
number
        // for the first segment, then the lower bound for the second segment and
        // the 1+upper bound index for the second segment.
    //   __Input=[[5 7 9 1 4][3 6 8 2]]
    //         => __Input.segments( )={0, 5, 9}
    do_all_in_parallel(int idx = 0;
                idx < __Input.segments( ).get_extent(0)-1 /* # of segments */;
                ++idx) {
        grid<1> grid_seg = __Input.segment_grid(idx);
        auto __Input_seg = section(__Input, grid_seg); // segment-number = idx
        auto __Output_seg = section(__Output, grid_seg);
        auto __Flags_seg = section(__Flags, grid_seg);
        split(__Input_seg, __Output_seg, __Flags_seg);
    }
}
bool is_sorted(nested_range<field<1, double>> __Input) {
    do_all_in_parallel(int idx = 0; idx < __Input.get_extent(0)-1; ++idx) {
        if (__Input[idx+1] > __Index[idx])
            return false;
    }
    return true;
}
void create_flags(nested_range<field<1, double>> __Input, field<1, int> __Flags) {
    do_all_in_parallel(int idx = 0;
                idx < __Input.segments( ).get_extent(0)-1 /* # of segments */;
                ++idx) {
        grid<1> grid_seg = __Input.segment_grid(idx);
        auto __Input_seg = section(__Input, grid_seg); // segment-number = idx
        auto __Flags_seg = section(__Flags, grid_seg);
        // Must be random for the quicksort algorithm below.
        // There are many other embodiments and algorithms.
        inr random_idx = random(0, __Input_seg.get_extent(0));
        __Flags_seg = (__Input_seg < __Input_seg[random_idx]);
    }
}
//
// Pick a random element of every segment and create a segmented flags vector by:
//      __Flags = { __Input[idx] < random-element | as idx varies }
// Perform a segmented_split using __Flags. When there are no segments of length >
1,
// then __Output is a sorted copy of __Input.
//
//          [ 9 7 1 5 6 3 4 2 8 ]
// pick 5 to generate the flags -- then the result of segmented_split is:
//          [ 1 3 4 2][9 7 5 6 8]
// pick 3, 7 to generate the flags -- then the result of segmented_split is:
//          [[1 2][3 4]][5 6][9 7 8]]
// only the last is not sorted, what if we picked 7,
// then all flags would be false and the split would do nothing with one part empty.
// This is why we constrain 'create_flags' to compare against a random chosen
element.
// There are many other embodiments and algorithms.
```

```
void quicksort(field<1, double> _Input, field<1, double> _Output) {
    // allocate some temporary variables
    nested_range<field<1, double>> _Tmp1 = _Input;
    nested_range<field<1, double>> _Tmp2 = _Output;
    field<1, int> _Flags(_Input.get_extent( ));
    // iterate until sorted
    // ... a shortcut would be to remove segments from processing,
    //     after they are sorted...
    while ( !is_sorted(_Tmp1)) {
        create_flags(_Tmp1, _Flags);
        segmented_split(_Tmp1, _Tmp2, _Flags);
        _Tmp1 = Tmp2;
    }
    //_Tmp1 is sorted
    _Output = _Tmp1;
}
```

The idea behind nested communications operator 12 and the type nested_range is to specify a dimension, _Dim, to be segmented, input a set of points 'field<1, int>_M_segments' (or member function segments( ) that segments (viz., partitions) the _Dim dimension, and allow the index operator of the parent to pass through unchanged. The function nested_range also provides the ability to easily specify the sub-object that corresponds to a given segment.

In the above function segmented_split,
    grid<1>grid_seg=_Input.segment_grid(idx);
returns the grid, where grid={extent, offset}, that represents the idx-th segment, For example, with:

```
    _Input=[[5 7 9 1 4][3 6 8 2]]
    => _Input.segments( )={0, 5, 9}
grid_seg = {5, 0} when idx = 0, and grid_seg={4, 5} when idx = 1.
```

With segmented_split, the_Input is a segmented indexable type and _Flags (with the same extent as _Input) specifies 0 or 1 (viz., false or true) for each element of _Input. For each segment in _Input, all elements with _Flags true are moved to the left of those with _Flags false—causing no other changes in ordering. Then_Output is a segmented indexable type of same extent as _Input, but with potentially twice the segments. For each segment in _Input, there are two segments in _Output—one for all the elements with _Flags true and the other for all elements with _Flags false.

By using the nested_range, the ability to trivially access individual sub-objects corresponding to segments (referred to as segments) is provided and non-segmented operations may be performed on each segment. For example, the idx-th segments in segmented_split are:

```
auto _Input_seg = section(_Input, grid_seg); // segment-number = idx
auto _Output_seg = section(_Output, grid_seg);
auto _Flags_seg = section(_Flags, grid_seg);
```

And the operation which does the split on each segment (viz., move the true elements to the left of the false elements) is:
    split(_Input_seg, _Output_seg, _Flags_seg);

In the above function create_flags, a random element is selected in each segment, _Input_seg[random_idx], and compared it to every other element of that segment to produce _Flags of the same extent as _Input. The elements of _Flags include a true value whenever (_Input_seg[any_idx]<_Input_seg[random_idx]) and false value otherwise. _Input and _Flags sub-objects are created for the idx-th segment:

```
grid<1> grid_seg = _Input.segment_grid(idx);
auto _Input_seg = section(_Input, grid_seg); // segment-number = idx
auto _Flags_seg = section(_Flags, grid_seg);
```

Then, in vector-notation:
    _Flags_seg=(_Input_seg<Input_seg[random_idx]);
equates to:

```
_Flags_seg = { (_Input_seg[0] < _Input_seg[random_idx]),
               (_Input_seg[1] < _Input_seg[random_idx]),
               . . .,
               (_Input_seg[grid_seg.get_extent(0)-1] <
                  _Input_seg[random_idx])}
```

FIG. 4 is a block diagram illustrating an embodiment of a computer system 100 configured to compile and execute data parallel code 10 that includes a nested communication operator 12.

Computer system 100 includes a host 101 with one or more processing elements (PEs) 102 housed in one or more processor packages (not shown) and a memory system 104. Computer system 100 also includes zero or more input/output devices 106, zero or more display devices 108, zero or more peripheral devices 110, and zero or more network devices 112. Computer system 100 further includes a compute engine 120 with one or more DP optimal compute nodes 121 where each DP optimal compute node 121 includes a set of one or more processing elements (PEs) 122 and a memory 124 that stores DP executable 138.

Host 101, input/output devices 106, display devices 108, peripheral devices 110, network devices 112, and compute engine 120 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a smart phone, a personal digital assistant (PDA), a mobile telephone, and an audio/video device. The components of computer system 100 (i.e., host 101, input/output devices 106, display devices 108, peripheral devices 110, network devices 112, interconnections 114, and compute engine 120)

may be contained in a common housing (not shown) or in any suitable number of separate housings (not shown).

Processing elements 102 each form execution hardware configured to execute instructions (i.e., software) stored in memory system 104. The processing elements 102 in each processor package may have the same or different architectures and/or instruction sets. For example, the processing elements 102 may include any combination of in-order execution elements, superscalar execution elements, and data parallel execution elements (e.g., GPU execution elements). Each processing element 102 is configured to access and execute instructions stored in memory system 104. The instructions may include a basic input output system (BIOS) or firmware (not shown), an operating system (OS) 132, code 10, compiler 134, GP executable 136, and DP executable 138. Each processing element 102 may execute the instructions in conjunction with or in response to information received from input/output devices 106, display devices 108, peripheral devices 110, network devices 112, and/or compute engine 120.

Host 101 boots and executes OS 132. OS 132 includes instructions executable by the processing elements to manage the components of computer system 100 and provide a set of functions that allow programs to access and use the components. In one embodiment, OS 132 is the Windows operating system. In other embodiments, OS 132 is another operating system suitable for use with computer system 100.

When computer system executes compiler 134 to compile code 10, compiler 134 generates one or more executables—e.g., one or more GP executables 136 and one or more DP executables 138. In other embodiments, compiler 134 may generate one or more GP executables 136 to each include one or more DP executables 138 or may generate one or more DP executables 138 without generating any GP executables 136. GP executables 136 and/or DP executables 138 are generated in response to an invocation of compiler 134 with data parallel extensions to compile all or selected portions of code 10. The invocation may be generated by a programmer or other user of computer system 100, other code in computer system 100, or other code in another computer system (not shown), for example.

GP executable 136 represents a program intended for execution on one or more general purpose processing elements 102 (e.g., central processing units (CPUs)). GP executable 136 includes low level instructions from an instruction set of one or more general purpose processing elements 102.

DP executable 138 represents a data parallel program or algorithm (e.g., a shader) that is intended and optimized for execution on one or more data parallel (DP) optimal compute nodes 121. In one embodiment, DP executable 138 includes DP byte code or some other intermediate representation (IL) that is converted to low level instructions from an instruction set of a DP optimal compute node 121 using a device driver (not shown) prior to being executed on the DP optimal compute node 121. In other embodiments, DP executable 138 includes low level instructions from an instruction set of one or more DP optimal compute nodes 121 where the low level instructions were inserted by compiler 134. Accordingly, GP executable 136 is directly executable by one or more general purpose processors (e.g., CPUs), and DP executable 138 is either directly executable by one or more DP optimal compute nodes 121 or executable by one or more DP optimal compute nodes 121 subsequent to being converted to the low level instructions of the DP optimal compute node 121.

Computer system 100 may execute GP executable 136 using one or more processing elements 102, and computer system 100 may execute DP executable 138 using one or more PEs 122 as described in additional detail below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 132, code 10, compiler 134, GP executable 136, and DP executable 138. The instructions are executable by computer system 100 to perform the functions and methods of OS 132, code 10, compiler 134, GP executable 136, and DP executable 138 as described herein. Memory system 104 stores instructions and data received from processing elements 102, input/output devices 106, display devices 108, peripheral devices 110, network devices 112, and compute engine 120. Memory system 104 provides stored instructions and data to processing elements 102, input/output devices 106, display devices 108, peripheral devices 110, network devices 112, and compute engine 120. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Compute engine 120 is configured to execute DP executable 138. Compute engine 120 includes one or more compute nodes 121. Each compute node 121 is a collection of computational resources that share a memory hierarchy. Each compute node 121 includes a set of one or more PEs 122 and a memory 124 that stores DP executable 138. PEs 122 execute DP executable 138 and store the results generated by DP executable 138 in memory 124. In particular, PEs 122 execute DP executable 138 to apply a nested communication operator 12 to an input indexable type 14 to generate an output indexable type 18 as shown in FIG. 4 and described in additional detail above.

A compute node 121 that has one or more computational resources with a hardware architecture that is optimized for data parallel computing (i.e., the execution of DP programs or algorithms) is referred to as a DP optimal compute node 121. Examples of a DP optimal compute node 121 include a node 121 where the set of PEs 122 includes one or more GPUs and a node 121 where the set of PEs 122 includes the set of SIMD units in a general purpose processor package. A compute node 121 that does not have any computational resources with a hardware architecture that is optimized for data parallel computing (e.g., processor packages with only general purpose processing elements 102) is referred to as a non-DP optimal compute node 121. In each compute node 121, memory 124 may be separate from memory system 104 (e.g., GPU memory used by a GPU) or a part of memory system 104 (e.g., memory used by SIMD units in a general purpose processor package).

Host 101 forms a host compute node that is configured to provide DP executable 138 to a compute node 121 for execution and receive results generated by DP executable 138 using interconnections 114. The host compute node includes is a collection of general purpose computational resources (i.e., general purpose processing elements 102) that share a memory hierarchy (i.e., memory system 104). The host compute node may be configured with a symmetric multiprocessing architecture (SMP) and may also be configured to maximize memory locality of memory system 104 using a non-uniform memory access (NUMA) architecture, for example.

OS 132 of the host compute node is configured to execute a DP call site to cause a DP executable 138 to be executed by a DP optimal or non-DP optimal compute node 121. In embodiments where memory 124 is separate from memory system 104, the host compute node causes DP executable 138 and one or more indexable types 14 to be copied from memory system 104 to memory 124. In embodiments where memory system 104 includes memory 124, the host compute node may designate a copy of DP executable 138 and/or one or more indexable types 14 in memory system 104 as memory 124 and/or may copy DP executable 138 and/or one or more indexable types 14 from one part of memory system 104 into another part of memory system 104 that forms memory 124. The copying process between compute node 121 and the host compute node may be a synchronization point unless designated as asynchronous.

The host compute node and each compute node 121 may concurrently execute code independently of one another. The host compute node and each compute node 121 may interact at synchronization points to coordinate node computations.

In one embodiment, compute engine 120 represents a graphics card where one or more graphics processing units (GPUs) include PEs 122 and a memory 124 that is separate from memory system 104. In this embodiment, a driver of the graphics card (not shown) may convert byte code or some other intermediate representation (IL) of DP executable 138 into the instruction set of the GPUs for execution by the PEs 122 of the GPUs.

In another embodiment, compute engine 120 is formed from the combination of one or more GPUs (i.e. PEs 122) that are included in processor packages with one or more general purpose processing elements 102 and a portion of memory system 104 that includes memory 124. In this embodiment, additional software may be provided on computer system 100 to convert byte code or some other intermediate representation (IL) of DP executable 138 into the instruction set of the GPUs in the processor packages.

In further embodiment, compute engine 120 is formed from the combination of one or more SIMD units in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the SIMD units in the processor packages.

In yet another embodiment, compute engine 120 is formed from the combination of one or more scalar or vector processing pipelines in one or more of the processor packages that include processing elements 102 and a portion of memory system 104 that includes memory 124. In this embodiment, additional software may be provided on computer system 100 to convert the byte code or some other intermediate representation (IL)of DP executable 138 into the instruction set of the scalar processing pipelines in the processor packages.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a compiler in a computer system, the method comprising:
    identifying a first nested communication operator that partitions a computational space in data parallel source code configured for execution on one or more data parallel optimal compute nodes having a special purpose architecture, the data parallel source code including data parallel features that take advantage of the special purpose architecture of the data parallel optimal compute nodes to allow data parallel operations to be executed faster or more efficiently than with general purpose processors; and
    generating data parallel executable code from the data parallel source code such that the data parallel executable code implements the first nested communication operator by generating an output indexable type that represents a plurality of segments of an input indexable type having a rank and an element, type defining the computational space.

2. The method of claim 1 wherein the input indexable type has a first rank and a first element type, and wherein the output indexable type has a second rank and a second element type that defines the plurality of segments.

3. The method of claim 1 wherein the data parallel executable code implements the nested communication operator by generating the output indexable type according to a specified dimension of the input indexable type.

4. The method of claim 1 wherein the data parallel executable code implements the nested communication operator by generating the output indexable type according to a segmentation vector that defines the plurality of segments.

5. The method of claim 1 further comprising:
    generating data parallel executable code from the data parallel source code such that the data parallel executable code applies a second nested communication operator to the output indexable type.

6. The method of claim 1 wherein the data parallel source code is written in a high level general purpose programming language with data parallel extensions.

7. The method of claim 1 wherein the data parallel source code is written in a high level data parallel programming language.

8. The method of claim 1 wherein the one or more data parallel optimal compute nodes include at least one graphics processing unit.

9. The method of claim 1 wherein the one or more data parallel optimal compute nodes include at least one general purpose processor.

10. A computer readable storage memory storing computer-executable instructions that, when executed by a computer system, cause the computer system to perform a method comprising:

generating an output indexable type from an input indexable type in response to a first nested communication operator that partitions a computational space in data parallel source code configured for execution on one or more data parallel optimal compute nodes having a special purpose architecture, the data parallel source code including data parallel features that take advantage of the special purpose architecture of the data parallel optimal compute nodes to allow data parallel operations to be executed faster or more efficiently than with general purpose processors, the input indexable type having a rank and an element type defining the computational space, the output indexable type representing a plurality of segments of the input indexable type; and performing a data parallel algorithm using the output indexable type.

11. The computer readable storage memory of claim 10, wherein the input indexable type has a first rank and a first element type, and wherein the output indexable type has a second rank and a second element type that defines the plurality of segments.

12. The computer readable storage memory of claim 10, further comprising:

generating the output indexable type according to a specified dimension of the input indexable type.

13. The computer readable storage memory of claim 10, further comprising:

generating the output indexable type according to a segmentation vector that defines the plurality of segments.

14. The computer readable storage memory of claim 10, further comprising:

applying a second nested communications operator to the output indexable type.

15. The computer readable storage memory of claim 10, wherein the data parallel source code is written in a programming language with data parallel extensions.

16. The computer readable storage memory of claim 10, wherein the data parallel source code is written in a high level data parallel programming language.

17. The computer readable storage memory of claim 10, wherein the one or more data parallel optimal compute nodes include at least one graphics processing unit.

18. The computer readable storage memory of claim 10, wherein the one or more data parallel optimal compute nodes include at least one general purpose processor.

19. A computer readable storage memory storing computer-executable instructions that, when executed by a computer system, perform a method comprising:

applying a nested communication operator that partitions a computational space to an input indexable type with a first rank and a first element type defining the computational space according to a specified dimension and a segmentation vector to generate an output indexable type with a second rank and a second element type that defines a plurality of segments of the input indexable type; and performing a data parallel algorithm using the output indexable type;

wherein the nested communications operator is included in data parallel source code written in a high level general purpose programming language with data parallel extensions, wherein the data parallel source code is configured for execution on one or more data parallel optimal compute nodes having a special purpose architecture, the data parallel extensions take advantage of the special purpose architecture of the data parallel optimal compute nodes to allow data parallel operations to be executed faster or more efficiently than with general purpose processors.

20. The computer readable storage memory of claim 19, wherein the data parallel source code is configured for execution on one or more data parallel optimal compute nodes that include at least one graphics processing unit.

* * * * *